United States Patent
Tan et al.

(10) Patent No.: US 10,883,735 B2
(45) Date of Patent: Jan. 5, 2021

(54) WATER PUMP OF AN AIR CONDITIONER AS WELL AS METHOD AND DEVICE FOR CONTROLLING THE SAME

(71) Applicants: Gree Electric Appliances (Wuhan) Co., Ltd., Wuhan (CN); Gree Electric Appliances, Inc. of Zhuhai, Zhuhai (CN)

(72) Inventors: Jianming Tan, Zhuhai (CN); Lin Yang, Zhuhai (CN); Hui Zhang, Zhuhai (CN); Youfu Xie, Zhuhai (CN); Kai Yu, Zhuhai (CN); Qunbo Liu, Zhuhai (CN); Handong Xue, Zhuhai (CN); Weiqiang Li, Zhuhai (CN)

(73) Assignees: Gree Electric Appliances (Wuhan) Co., Ltd., Wuhan (CN); Gree Electric Appliances, Inc. of Zhuhai, Guangdong (CN)

( * ) Notice: Subject to any disclaimer, the term of this patent is extended or adjusted under 35 U.S.C. 154(b) by 196 days.

(21) Appl. No.: 16/080,821

(22) PCT Filed: Jul. 3, 2018

(86) PCT No.: PCT/CN2018/094245
§ 371 (c)(1),
(2) Date: Aug. 29, 2018

(87) PCT Pub. No.: WO2019/184127
PCT Pub. Date: Oct. 3, 2019

(65) Prior Publication Data
US 2020/0049359 A1   Feb. 13, 2020

(30) Foreign Application Priority Data
Mar. 30, 2018 (CN) .......................... 2018 1 0297967

(51) Int. Cl.
*F24F 11/30* (2018.01)
*F24F 11/85* (2018.01)
(Continued)

(52) U.S. Cl.
CPC ............... *F24F 11/30* (2018.01); *F24F 1/36* (2013.01); *F24F 11/42* (2018.01); *F24F 11/61* (2018.01);
(Continued)

(58) Field of Classification Search
CPC .. F24F 11/30; F24F 11/85; F24F 11/64; F24F 11/42; F24F 11/61; F24F 1/36;
(Continued)

(56) References Cited

U.S. PATENT DOCUMENTS

| 2014/0008253 A1* | 1/2014 | Cantolino | ............ G01D 11/245 206/305 |
| 2018/0120011 A1* | 5/2018 | Goldman | .................. F24D 3/18 |

FOREIGN PATENT DOCUMENTS

| CN | 102818347 A | 12/2012 |
| CN | 202792293 U | 3/2013 |

(Continued)

*Primary Examiner* — Rocio Del Mar Perez-Velez
*Assistant Examiner* — Hung H Dang
(74) *Attorney, Agent, or Firm* — The Webb Law Firm

(57) ABSTRACT

The present disclosure has disclosed an water pump of an air conditioner as well as a method and device for controlling the same, wherein the method for controlling an water pump of an air conditioner comprises: obtaining a state of a liquid level switch of the air conditioner, a state of operation of the air conditioner and an outdoor ambient temperature; and determining a turn-on timing of the water pump of the air conditioner according to the state of the liquid level switch of the air conditioner, the state of operation of the air conditioner and the outdoor ambient temperature obtained. The present disclosure solves the problem that the turn-on (Continued)

time of the water pump of the air conditioner in the prior art is not smart enough, so as to make the turn-on time of the water pump of the air conditioner more intelligent, whilst improving the safety of the water pump of the air conditioner is improved, and saving the energy.

11 Claims, 2 Drawing Sheets

(51) Int. Cl.
*F24F 11/64* (2018.01)
*F24F 11/42* (2018.01)
*F24F 11/61* (2018.01)
*F24F 1/36* (2011.01)
*G05B 19/048* (2006.01)
*F24F 110/22* (2018.01)
*F24F 110/12* (2018.01)
*F24F 140/30* (2018.01)

(52) U.S. Cl.
CPC .............. *F24F 11/64* (2018.01); *F24F 11/85* (2018.01); *G05B 19/048* (2013.01); *F24F 2110/12* (2018.01); *F24F 2110/22* (2018.01); *F24F 2140/30* (2018.01); *G05B 2219/2614* (2013.01)

(58) Field of Classification Search
CPC .............. F24F 2110/22; F24F 2110/12; F24F 2140/30; G05B 19/048; G05B 2219/2614
See application file for complete search history.

(56) References Cited

FOREIGN PATENT DOCUMENTS

| | | | |
|---|---|---|---|
| CN | 105180294 A | * | 12/2015 |
| CN | 105180294 A | | 12/2015 |
| CN | 105180408 A | | 12/2015 |
| CN | 205372966 U | | 7/2016 |
| CN | 106500248 A | | 3/2017 |
| CN | 106989485 A | * | 7/2017 |
| CN | 106989485 A | | 7/2017 |
| JP | 6155531 A | | 3/1986 |
| JP | 4297744 A | | 10/1992 |
| JP | 861687 A | | 3/1996 |
| JP | 201492350 A | | 5/2014 |

\* cited by examiner

WATER PUMP OF AN AIR CONDITIONER AS WELL AS METHOD AND DEVICE FOR CONTROLLING THE SAME

CROSS-REFERENCE TO RELATED APPLICATIONS

This application is the United States national phase of International Application No. PCT/CN2018/094245 filed Jul. 3, 2018, and claims priority to Chinese Patent Application No. 201810297967.9 filed on Mar. 30, 2018, and the disclosures of which are hereby incorporated in their entirety by reference.

FIELD OF THE DISCLOSURE

The present disclosure relates to the technical field of air conditioner, and specially relates to an water pump of an air conditioner as well as a method and device for controlling the same.

BACKGROUND OF THE DISCLOSURE

At present, the condensed water generated by the outdoor unit of an air conditioner under a heating mode is directly discharged to the outdoor through the discharge hole. With the increasingly raised living conditions and safety awareness of the people, in some special places and areas, it is required that the condensed water of the outdoor unit cannot be directly discharged to the outdoor, but needs to be drained to a specific occasion by a water pump. In the case that the water pump is not turned on in time, it is likely to cause the water in the chassis of the outdoor unit to be frozen, and it is likely to cause that the water pump is damaged when the water pump is turned on afterwards. When the water pump is actuated for an excessively long time or keeps running, it is also possible to cause the problem of energy waste.

Among the arts known to the inventors, there is no effective solution that has been proposed for the problem that the turn-on timing of the water pump of the air conditioner is not smart enough.

SUMMARY OF THE DISCLOSURE

According to one aspect of an embodiment of the present disclosure, there is provided a method for controlling an water pump of an air conditioner, which comprises: obtaining a state of a liquid level switch of the air conditioner, a working state of the air conditioner and an outdoor ambient temperature; and determining a turn-on timing of the water pump of the air conditioner according to the state of the liquid level switch of the air conditioner, the working state of the air conditioner and the outdoor ambient temperature obtained.

Further, the step of determining a turn-on timing of the water pump of the air conditioner according to the state of the liquid level switch of the air conditioner, the working state of the air conditioner and the outdoor ambient temperature obtained includes: detecting whether the liquid level switch of the air conditioner is in a turn-on state; and if the liquid level switch of the air conditioner is in the turn-on state, turning on the water pump of the air conditioner; or if the liquid level switch of the air conditioner is not in a turn-on state, determining whether a current working state of the air conditioner is a heating mode, and determining a turn-on timing of the water pump of the air conditioner according to the outdoor ambient temperature when the current operation state of the air conditioner is a heating mode.

Further, wherein the step of determining a turn-on timing of the water pump of the air conditioner according to the outdoor ambient temperature when the current operation state of the air conditioner is a heating mode includes: comparing the outdoor ambient temperature with a preset frosting threshold temperature; and turning on the water pump of the air conditioner when the outdoor ambient temperature is greater than the frosting threshold temperature; or judging whether the air conditioner is in a defrosting mode when the outdoor ambient temperature is less than or equal to the frosting threshold temperature, and turning on the water pump of the air conditioner when the air conditioner is in the defrosting mode.

Further, wherein when the liquid level switch of the air conditioner is in a turn-on state, after the step of turning on the water pump of the air conditioner, the control method further comprises: monitoring whether the liquid level switch of the air conditioner is off; starting a timing operation if monitoring that the liquid level switch of the air conditioner is off; and turning off the water pump of the air conditioner if the timing reaches a first preset time threshold.

Further, wherein when the outdoor ambient temperature is greater than the frosting threshold temperature, after the step of turning on the water pump of the air conditioner, the control method further comprises: monitoring an on-and-off state of the air conditioner; starting a timing operation if monitoring that the air conditioner is powered off; and turning off the water pump of the air conditioner if the timing reaches a third preset time threshold.

Further, wherein when the air conditioner is judged to be in the defrosting mode, after the step of turning on the water pump of the air conditioner, the control method further comprises: monitoring an on-and-off state of the defrosting mode; starting a timing operation if monitoring that the defrosting mode stops; and turning off the water pump of the air conditioner if the timing reaches a second preset time threshold.

According to another aspect of an embodiment of the present disclosure, there is provided device for controlling a water pump of an air conditioner, comprising: an obtaining module, for obtaining a state of a liquid level switch of the air conditioner, a working state of the air conditioner and an outdoor ambient temperature; and a control module, for determining a turn-on timing of the water pump of the air conditioner according to the state of the liquid level switch of the air conditioner, the working state of the air conditioner and the outdoor ambient temperature obtained.

Further, the control module includes: a detecting module, for detecting whether the liquid level switch of the air conditioner is in a turn-on state; a first turn-on controlling unit, for turning on the water pump of the air conditioner when the liquid level switch of the air conditioner is in a turn-on state; and a second turn-on controlling unit, for determining whether a current working state of the air conditioner is a heating mode when the liquid level switch of the air conditioner is not in a turn-on state, and determining a turn-on timing of the water pump of the air conditioner according to the outdoor ambient temperature when the current working state of the air conditioner is a heating mode.

Further, the control module further includes: a monitoring unit, for monitoring whether the liquid level switch of the air conditioner is off after turning on the water pump of the air conditioner when the liquid level switch of the air conditioner is in a turn-on state; a timing unit, for starting a timing operation after monitoring that the liquid level switch of the air conditioner is off; and a turn-off controlling unit, for turning off the water pump of the air conditioner if the timing reaches a first preset time threshold.

Further, the second turn-on controlling unit further includes: a comparing subunit, for comparing the outdoor ambient temperature with a preset frosting threshold temperature when the current operation state of the air conditioner is a heating mode; a first turn-on controlling subunit, for turning on the water pump of the air conditioner when the outdoor ambient temperature is greater than the frosting threshold temperature; and a second turn-on controlling subunit, for judging whether the air conditioner is in a defrosting mode when the outdoor ambient temperature is less than or equal to the frosting threshold temperature, and turning on the water pump of the air conditioner when the air conditioner is judged to be in the defrosting mode.

Further, the second turn-on controlling unit further includes: a first monitoring subunit, for monitoring an on-and-off state of the air conditioner after turning on the water pump of the air conditioner when the outdoor ambient temperature is greater than the frosting threshold temperature; a first timing subunit, for starting a timing operation if monitoring that the air conditioner is powered off; and a first turn-off controlling subunit, for turning off the water pump of the air conditioner if the timing reaches a third preset time threshold.

Further, wherein the second turn-on controlling unit further includes: a second monitoring subunit, for monitoring an on-and-off state of a defrosting mode after turning on the water pump of the air conditioner when the air conditioner is judged to be in the defrosiing mode; a second timing subunit, for starting a timing operation if monitoring that the defrosting mode stops; and a second turn-off controlling subunit, for controlling to turn off the water pump of the air conditioner after the timing reaches a second preset time threshold.

According to still another aspect of an embodiment of the present disclosure, there is provided a water pump of an air conditioner, comprising the device for controlling a water pump of an air conditioner according to the aforementioned embodiments.

In an embodiment of the present disclosure, in order to avoid an excessively long or short turn-on time of the water pump of the air conditioner to cause the problem of the damage of the water pump or the waste of energy, there are set a group of parameters for reflecting whether the water pump of the air conditioner needs to be turned on, including a state of the liquid level switch of the air conditioner, a working state of the air conditioner and an outdoor ambient temperature, so as to determine a turn-on timing of the water pump of the air conditioner by obtaining such group of parameters. Such control method effectively solves the problem that the turn-on time of the water pump of the air conditioner in the prior art is not smart enough, so as to make the turn-on time of the water pump of the air conditioner more intelligent, whilst improving the safety of the water pump of the air conditioner, and saving the energy.

BRIEF DESCRIPTION OF THE ACCOMPANYING DRAWINGS

The accompanying drawings of the description that constitute a part of the present application, are used to provide a further understanding of the present disclosure. The illustrative embodiments of the present disclosure as well as the descriptions thereof, which are used for explaining the present disclosure, do not constitute improper definitions on the present disclosure. In the drawings.

DETAILED DESCRIPTION OF THE PREFERRED EMBODIMENTS

Figure 1:
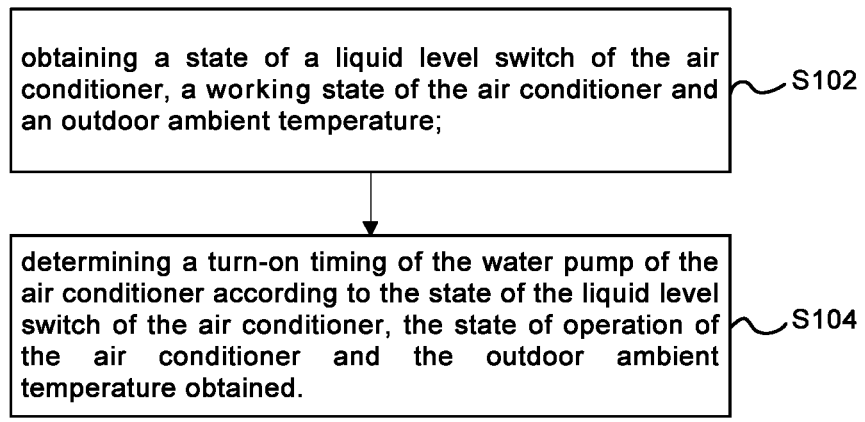
FIG. 1 is a flow chart of one embodiment of the method for controlling the water pump of the air conditioner according to the present disclosure.

Detailed explanations will be made here to the exemplary embodiments, the examples of which are presented in the drawings. When the following descriptions involve the drawings, unless otherwise presented, the same numerals in different drawings present the same or similar elements. The embodiments described in the following exemplary embodiments are not representative of all the embodiments consistent with the present disclosure. By contrary, they are merely examples of devices and methods consistent with some aspects of the present disclosure as detailed in the appended claims.

In a first aspect of the embodiments of the present disclosure, a method for controlling a water pump of an air conditioner is provided to at least solve the problem that the turn-on timing of the water pump of the air conditioner in the prior art is not smart enough. The control method may be directly applied to an air conditioning unit, for example, a household air conditioning unit, an air conditioning unit for a shopping mall or a workshop, an air conditioning unit for a ship, etc. In addition, the present method may also be applied to other devices having the function of an air conditioning unit. The method may be implemented as a built-in program on an air conditioning unit or a device, or may also be implemented in such a manner as to install an application (APP) or install a software on an air conditioning unit or a device. Specifically, FIG. 1 shows an optional flow chart of the method. As shown in FIG. 1, the method comprises the following steps S102-S104:

S102: obtaining a state of a liquid level switch of the air conditioner, a working state of the air conditioner and an outdoor ambient temperature;

S104: determining a turn-on timing of the water pump of the air conditioner according to the state of the liquid level switch of the air conditioner, the working state of the air conditioner and the outdoor ambient temperature obtained.

After obtaining the parameters of the state of the liquid level switch of the air conditioner, the working state of the air conditioner and the outdoor ambient temperature for reflecting whether the water pump of the air conditioner needs to be turned on, a turn-on timing of the water pump of the air conditioner is determined according to the state of the liquid level switch of the air conditioner, the state of operation of the air conditioner and the outdoor ambient temperature obtained.

In the embodiments of the present disclosure, there are set a group of parameters for reflecting whether the water pump of the air conditioner needs to be turned on, including: the state of the liquid level switch of the air conditioner, the state of operation of the air conditioner and the outdoor ambient temperature. Compared with the manner of controlling whether to turn on the water pump of the air conditioner only by a state of the liquid level switch of the air conditioner in the conventional art, the design solution of setting a plurality of parameters for controlling whether to turn on the water pump of the air conditioner can handle more circumstances in which there is a need to turn on the water pump of the air conditioner under other operational circumstances, so as to solve the problem that the water pump of the air conditioner is not turned on enough in time and it is likely to damage the water pump when turned on again after the water in the chassis of the outdoor unit is frozen. Accordingly, the present disclosure sets a group of parameters reflecting whether the water pump of the air conditioner needs to be turned on, such as to enable more accurately determine whether the air conditioner needs to be turned on by such group of parameters.

In some embodiments, S104 specifically includes: first detecting whether the liquid level switch of the air conditioner is in a turn-on state, and if the detection result is that the liquid level switch of the air conditioner is in a turn-on state directly turn on the water pump of the air conditioner; or if the detection result is that the liquid level switch of the air conditioner is not in a turn-on state, further determine whether a current working state of the air conditioner is a heating mode, and to determine a turn-on timing of the water pump of the air conditioner according to the outdoor ambient temperature when the current operation state of the air conditioner is a heating mode.

In some embodiments, the step of determining a turn-on timing of the water pump of the air conditioner according to the outdoor ambient temperature when the current operation state of the air conditioner is a heating mode specifically includes: comparing the outdoor ambient temperature with a preset frosting threshold temperature when the current operation state of the air conditioner is a heating mode. The preset frosting threshold temperature is a critical temperature for judging whether the condenser tube of the outdoor unit frosts or generates condensed water when the air conditioner is under a heating mode, for example 0 degree. When the outdoor ambient temperature is greater than the frosting threshold temperature, the outdoor unit of the air conditioner may generate condensed water, and at this time the water pump of the air conditioner is controlled to be turned on. When the outdoor ambient temperature is less than or equal to the frosting threshold temperature, the outdoor unit of the air conditioner may frost, and at this time it is necessary to judge whether the air conditioner is in a defrosting mode. When it is judged that the air conditioner is in a defrosting mode, the outdoor unit of the air conditioner may generate condensed water at this time, and the water pump of the air conditioner is controlled to be turned on.

In the aforementioned embodiments, in order to avoid an excessively long or short turn-on time of the water pump of the air conditioner to cause the problem of the damage of the water pump or the waste of energy, there are set a group of parameters for reflecting whether the water pump of the air conditioner needs to be turned on, including the state of the liquid level switch of the air conditioner, the working state of the air conditioner and an outdoor ambient temperature, so as to determine a turn-on timing of the water pump of the air conditioner by obtaining such group of parameters. Such control method effectively solves the problem that the turn-on time of the water pump of the air conditioner in the prior art is not smart enough, so as to make the turn-on time of the water pump of the air conditioner more intelligent, whilst improving the safety of the water pump of the air conditioner is improved, and saving the energy.

In some embodiments, the present disclosure not only smartly controls the turn-on timing of the water pump of the air conditioner, but also smartly controls the turn-off timing of the water pump of the air conditioner. The control method further comprises: when the liquid level switch of the air conditioner is in a turn-on state, after turning on the water pump of the air conditioner, monitoring whether the liquid level switch of the air conditioner is off; starting a timing operation if monitoring that the liquid level switch of the air conditioner is off; and turning off the water pump of the air conditioner if the timing reaches a first preset time threshold.

According to the embodiments of the present disclosure, after the liquid level switch of the air conditioner is off, at this time it is possible that there is still remaining condensed water that has not been discharged, so that the water pump is not turned off immediately. Rather, the water pump is turned off when the liquid level switch of the air conditioner is off to reach a first preset time threshold. That is, the present disclosure delays the turn-off time of the water pump of the air conditioner, to drain the condensed water and avoid the problems resulting from residual condensed water.

Further, in some embodiments, the smart control of the turn-off timing of the water pump of the air conditioner further includes: when the outdoor ambient temperature is greater than the frosting threshold temperature, after turning on the water pump of the air conditioner, monitoring an on-and-off state of the air conditioner; starting a timing operation if monitoring that the air conditioner is powered off; and turning off the water pump of the air conditioner if the timing reaches a third preset time threshold.

In some embodiments, the smart control of the turn-off timing of the water pump of the air conditioner further comprises: when the air conditioner is judged to be in the defrosting mode, after turning on the water pump of the air conditioner, monitoring an on-and-off state of the defrosting mode; and starting a timing operation if monitoring that the defrosting mode stops; controlling to turn off the water pump of the air conditioner if the timing reaches a second preset time threshold.

Similarly, when the air conditioner is turned off, or the defrosting of the air conditioner is accomplished, the water pump is not turned off immediately. Rather, the water pump is turned off when the air conditioner is turned off to reach a third preset time threshold, or the defrosting of the air conditioner is accomplished to reach a second preset time threshold. The turn-off time of the water pump of the air conditioner is delayed, to drain the condensed water and avoid the problems resulting from residual condensed water.

In some embodiments, before obtaining the state of a liquid level switch of the air conditioner, the working state of the air conditioner and an outdoor ambient temperature, the control method of the present disclosure further comprises: in response to a triggered adjustment instruction, adjusting at least one of the first preset time threshold, the second preset time threshold and the third preset time threshold by a preset communication interface, wherein the air conditioner is preserved with a preset communication interface. That is, in the present disclosure, the first preset time threshold, the second preset time threshold, and the third preset time threshold are time constants which may be set according to different unit sizes and environmental requirements.

Figure 2:
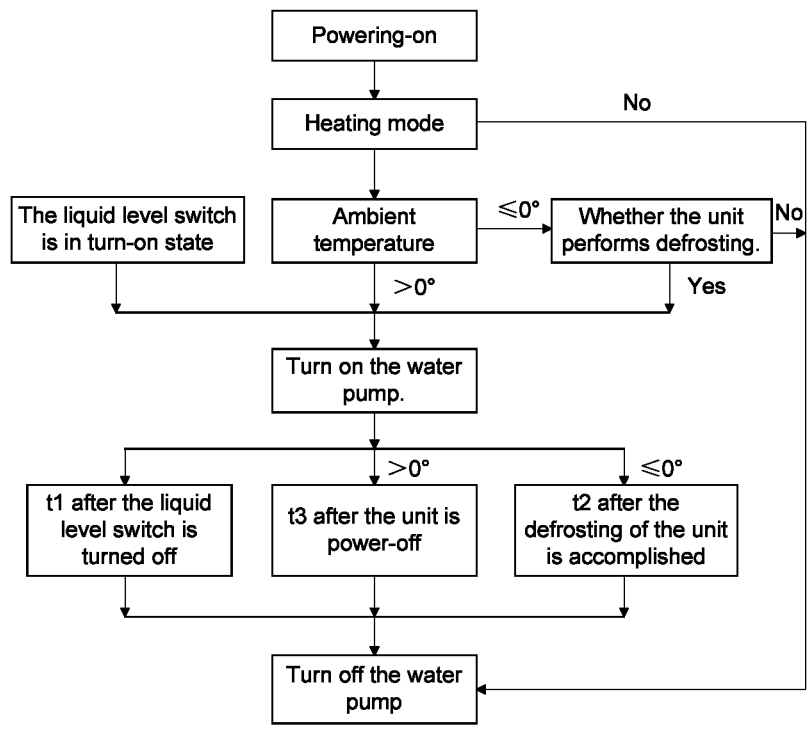
FIG. 2 is a flow chart of another embodiment of the method for controlling the water pump of the air conditioner according to the present disclosure.

For another embodiment of the method for controlling a water pump of the air conditioner according to the present disclosure, FIG. 2 shows an alternative flow chart of the method, which is illustrated below in combination with FIG. 2. The method comprises:

powering on;

detecting whether the liquid level switch of the outdoor unit is turned on, and controlling to turn on the water pump when the liquid level switch is in an turn-on state;

detecting whether the air conditioner is in a heating mode when the liquid level switch is in an off state, wherein the water pump is not turned on when the air conditioner is not in a heating mode, and an outdoor ambient temperature is detected by an ambient thermo-bulb to judge an interval of the outdoor ambient temperature when the air conditioner is in a heating mode;

turning on the water pump if the ambient temperature is greater than 0° C. (frosting threshold temperature), and judging whether the unit performs a defrosting action if the ambient temperature is less than or equal to 0° C.;

keeping the water pump in an off state if the unit does not perform a defrosting action, and turning on the water pump if the unit performs a defrosting action;

turning off the water pump when the unit detects that the liquid level switch is off in the working process of the outdoor unit, and the turn-off time of the liquid level switch reaches t1 (t1 is a time constant, corresponding to the first preset time threshold);

turning off the water pump when the unit detects that the unit is powered off in the working process of the outdoor unit, and the time after the power-off reaches t3 (t3 is a time constant, corresponding to the third preset time threshold);

turning off the water pump when the unit detects that the unit accomplishes the defrosting in the working process of the outdoor unit, and the time after the defrosting is accomplished reaches t2 (t2 is a time constant, corresponding to the second preset time threshold).

In the present embodiment, t1, t2 and t3 are time constants, and the time may be set according to different unit sizes and environmental requirements.

In the aforementioned embodiments, in order to avoid an excessively long or short turn-on time of the water pump of the air conditioner to cause the problem of the damage of the water pump or the waste of energy, there are set a group of parameters for reflecting whether the water pump of the air conditioner needs to be turned on, including the state of the liquid level switch of the air conditioner, the working state of the air conditioner and an outdoor ambient temperature, so as to determine a turn-on timing of the water pump of the air conditioner by obtaining such group of parameters. Such control method effectively solves the problem that the turn-on time of the water pump of the air conditioner in the prior art is not smart enough, so as to make the turn-on time of the water pump of the air conditioner more intelligent, whilst improving the safety of the water pump of the air conditioner is improved, and saving the energy.

Figure 3:
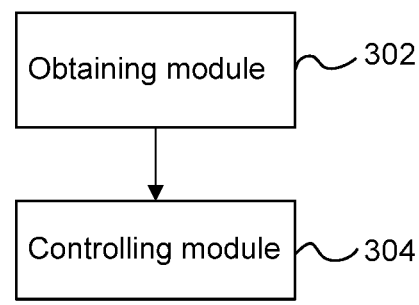
FIG. 3 is a structural block diagram of one embodiment of the device for controlling the water pump of the air conditioner according to the present disclosure.

Based on the method for controlling the water pump of the air conditioner provided by the aforementioned embodiment, the second aspect of the present disclosure further provides a device for controlling the water pump of the air conditioner. FIG. 3 shows an alternative structural block diagram of the device. As shown in FIG. 3, the device comprises:

an obtaining module 302, for obtaining a state of a liquid level switch of the air conditioner, a working state of the air conditioner and an outdoor ambient temperature; and a control module 304 connected with the obtaining module 302, for determining a turn-on timing of the water pump of the air conditioner according to the state of the liquid level switch of the air conditioner, the working state of the air conditioner and the outdoor ambient temperature obtained.

In the embodiment, in order to avoid an excessively long or short turn-on time of the water pump of the air conditioner to cause the problem of the damage of the water pump or the waste of energy, there are set a group of parameters for reflecting whether the water pump of the air conditioner needs to be turned on, including the state of the liquid level switch of the air conditioner, the state of operation of the air conditioner and the outdoor ambient temperature, so as to determine a turn-on timing of the water pump of the air conditioner by obtaining such group of parameters. Such control method effectively solves the problem that the turn-on time of the water pump of the air conditioner in the prior art is not smart enough, so as to make the turn-on time of the water pump of the air conditioner more intelligent, whilst improving the safety of the water pump of the air conditioner is improved, and saving the energy.

In another embodiment of the present disclosure, the control module includes: a detecting module, for detecting whether the liquid level switch of the air conditioner is in a turn-on state; a first turn-on controlling unit, for controlling to turn on the water pump of the air conditioner when the liquid level switch of the air conditioner is in a turn-on state; and a second turn-on controlling unit, for determining whether a current operation state of the air conditioner is a heating mode when the liquid level switch of the air conditioner is not in a turn-on state, and determining a turn-on timing of the water pump of the air conditioner according to the outdoor ambient temperature when the current operation state of the air conditioner is a heating mode.

In some embodiments, the control module further includes: a monitoring unit, for monitoring whether the liquid level switch of the air conditioner is off after controlling to turn on the water pump of the air conditioner when the liquid level switch of the air conditioner is in a turn-on state; a timing unit, for starting a timing operation if monitoring that the liquid level switch of the air conditioner is off; and a turn-off controlling unit, for controlling to turn off the water pump of the air conditioner if the timing reaches a first preset time threshold.

In other embodiments of the present disclosure, the second turn-on controlling unit further includes: a comparing subunit, for comparing the outdoor ambient temperature with a preset frosting threshold temperature when the current working state of the air conditioner is a heating mode; a first turn-on controlling subunit, for controlling to turn on the water pump of the air conditioner when the outdoor ambient temperature is greater than the frosting threshold temperature; and a second turn-on controlling subunit, for judging whether the air conditioner enters a defrosting mode when the outdoor ambient temperature is less than or equal to the frosting threshold temperature, and controlling to turn on the water pump of the air conditioner when the air conditioner is judged to enter the defrosting mode.

In some embodiments, the second turn-on controlling unit further includes: a first monitoring subunit, for monitoring an on-and-off state of the air conditioner after controlling to turn on the water pump of the air conditioner when the outdoor ambient temperature is greater than the frosting threshold temperature; a first timing subunit, for starting a timing operation if monitoring to obtain that the air conditioner is powered off; and a first turn-off controlling subunit, for controlling to turn off the water pump of the air conditioner if the timing reaches a third preset time threshold.

In some embodiments, the second turn-on controlling unit further includes: a second monitoring subunit, for monitoring an on-and-off state of a defrosting mode after controlling to turn on the water pump of the air conditioner when the air conditioner is judged to enter the defrosting mode; a second timing subunit, for starting a timing operation if monitoring to obtain that the defrosting mode stops; and a second turn-off controlling subunit, for controlling to turn off the water pump of the air conditioner after the timing reaches a second preset time threshold.

The third aspect of the present disclosure further provides a water pump of an air conditioner, comprising the aforementioned device for controlling a water pump of an air conditioner.

Regarding the device in the aforementioned embodiment, the specific manner of performing an operation by each unit and module therein has been described in detail in the embodiments concerning the method, and thus will no longer be formulated and explained in detail here.

A person skilled in the art after considering the description and practicing the embodiments disclosed here, will easily anticipate other implementing solutions of the present disclosure. The present disclosure is intended to cover any variation, use, or adaptive change of the present disclosure, which follows general principles of the present disclosure and include common knowledge or conventional technical means in the art that has not been disclosed in the present disclosure. The description and examples are only considered to be exemplary, while the actual scope and spirit of the present disclosure are set forth in the following claims.

It should be understood that, the present disclosure is not limited to the above accurate structure that has been described and shown in the drawings, and various modifications and alterations may be made without departing from the scope thereof. The scope of the present disclosure is only limited by the appended claims.

The invention claimed is:

1. A method for controlling a water pump of an air conditioner, comprising:
   obtaining a state of a liquid level switch of the air conditioner, a working state of the air conditioner, and an outdoor ambient temperature;
   determining a turn-on state of the liquid level switch of the air conditioner; and
   in response determining that the liquid level switch of the air conditioner is not in a turn-on state:
      determining a working state of the air conditioner, and in response to determining that the working state of the air conditioner is a heating mode:
      comparing the outdoor ambient temperature with a preset frosting threshold temperature; and
      turning on the water pump of the air conditioner when the outdoor ambient temperature is greater than the preset frosting threshold temperature; and
      in response to detecting that the outdoor ambient temperature is less than or equal to the preset frosting threshold temperature, determining the working state of the air conditioner, and in response to determining that the working state of the air conditioner is a defrosting mode, turning on the water pump of the air conditioner.

2. The method for controlling a water pump of an air conditioner according to claim 1, further comprising, in response to detecting that the liquid level switch of the air conditioner is in the turn-on state, turning on the water pump of the air conditioner.

3. The method for controlling a water pump of an air conditioner according to claim 2, wherein when the liquid level switch of the air conditioner is in a turn-on state, after turning on the water pump of the air conditioner, further comprising:
   monitoring whether the liquid level switch of the air conditioner is off;
   starting a timing operation if monitoring that the liquid level switch of the air conditioner is off; and
   turning off the water pump of the air conditioner if the timing reaches a first preset time threshold.

4. The method for controlling a water pump of an air conditioner according to claim 1, wherein when the outdoor ambient temperature is greater than the preset frosting threshold temperature, after turning on the water pump of the air conditioner, further comprising:
   monitoring an on-and-off state of the air conditioner;
   in response to determining that the air conditioner, except for the water pump, has been powered off, starting a timing operation; and
   turning off the water pump of the air conditioner if the timing reaches a third preset time threshold.

5. The method for controlling a water pump of an air conditioner according to claim 1, wherein when the air conditioner is judged to be in the defrosting mode, after turning on the water pump of the air conditioner, further comprising:
   monitoring an on-and-off state of the defrosting mode;
   starting a timing operation if monitoring that the defrosting mode stops; and
   turning off the water pump of the air conditioner if the timing reaches a second preset time threshold.

6. A hardware device for controlling a water pump of an air conditioner, the hardware device configured to execute program instructions comprising:
   an obtaining module, for obtaining a state of a liquid level switch of the air conditioner, a working state of the air conditioner and an outdoor ambient temperature; and
   a control module, wherein the control module comprises:
      a detecting module, for detecting whether the liquid level switch of the air conditioner is in a turn-on state; and
      a second turn-on controlling unit, for determining whether a current working state of the air conditioner is a heating mode when the liquid level switch of the air conditioner is not in a turn-on state, and determining a turn-on timing of the water pump of the air conditioner according to the outdoor ambient temperature when the current working state of the air conditioner is a heating mode; wherein the second turn-on controlling unit comprises:
         a comparing subunit, for comparing the outdoor ambient temperature with a preset frosting threshold temperature when the current working state of the air conditioner is a heating mode; and
         a second turn-on controlling subunit, for determining whether the air conditioner is in a defrosting mode when the outdoor ambient temperature is less than or equal to the preset frosting threshold temperature, and turning on the water pump of the air conditioner when the air conditioner is determined to be in the defrosting mode.

7. The hardware device for controlling a water pump of an air conditioner according to claim 6, wherein the control module further comprises: a first turn-on controlling unit, for turning on the water pump of the air conditioner when the liquid level switch of the air conditioner is in a turn-on state.

8. The hardware device for controlling a water pump of an air conditioner according to claim 7, wherein the control module further comprises:
   a monitoring unit, for monitoring whether the liquid level switch of the air conditioner is off after turning on the water pump of the air conditioner when the liquid level switch of the air conditioner is in a turn-on state;

a timing unit, for starting a timing operation if monitoring that the liquid level switch of the air conditioner is off; and a turn-off controlling unit, for turning off the water pump of the air conditioner if the timing reaches a first preset time threshold.

9. The hardware device for controlling a water pump of an air conditioner according to claim 6, wherein the second turn-on controlling unit further comprises:

a first monitoring subunit, for monitoring an on-and-off state of the air conditioner after turning on the water pump of the air conditioner when the outdoor ambient temperature is greater than a preset frosting threshold temperature;

a first timing subunit, for starting a timing operation in response to determining that the air conditioner, except for the water pump, is powered off; and a first turn-off controlling subunit, for turning off the water pump of the air conditioner if the timing reaches a third preset time threshold.

10. The hardware device for controlling a water pump of an air conditioner according to claim 6, wherein the second turn-on controlling unit further comprises:

a second monitoring subunit, for monitoring an on-and-off state of a defrosting mode after turning on the water pump of the air conditioner when the air conditioner is judged to be in the defrosting mode;

a second timing subunit, for starting a timing operation if monitoring that the defrosting mode stops; and a second turn-off controlling subunit, for turning off the water pump of the air conditioner if the timing reaches a second preset time threshold.

11. A water pump of an air conditioner, comprising the hardware device for controlling a water pump of an air conditioner according to claim 6.

* * * * *